US012775764B2

(12) United States Patent
Pratap et al.

(10) Patent No.: US 12,775,764 B2
(45) Date of Patent: Oct. 27, 2026

(54) AUTOMATED DESIGN HIERARCHY IDENTIFICATION AND SIMPLIFIED REDUCED MODEL GENERATION FOR STATIC VERIFICATION OF CIRCUIT DESIGNS

(71) Applicant: Synopsys, Inc., Mountain View, CA (US)

(72) Inventors: Gaurav Pratap, Noida (IN); Bhaskar Pal, Bangalore (IN); Mohit Kumar, New Delhi (IN)

(73) Assignee: Synopsys, Inc., Sunnyvale, CA (US)

( * ) Notice: Subject to any disclaimer, the term of this patent is extended or adjusted under 35 U.S.C. 154(b) by 1097 days.

(21) Appl. No.: 17/684,287

(22) Filed: Mar. 1, 2022

(65) Prior Publication Data

US 2022/0284161 A1 Sep. 8, 2022

Related U.S. Application Data

(60) Provisional application No. 63/155,859, filed on Mar. 3, 2021.

(51) Int. Cl.

*G06F 30/33* (2020.01)
*G06F 111/04* (2020.01)
*G06F 119/06* (2020.01)

(52) U.S. Cl.

CPC .......... *G06F 30/33* (2020.01); *G06F 2111/04* (2020.01); *G06F 2119/06* (2020.01)

(58) Field of Classification Search

CPC .. G06F 30/33; G06F 2119/06; G06F 30/3323; G06F 30/392; G06F 30/394; G06F 30/398

See application file for complete search history.

(56) References Cited

U.S. PATENT DOCUMENTS 5,796,985 A * 8/1998 O'Brien .................. G06F 30/33 716/113
5,880,967 A * 3/1999 Jyu ....................... G06F 30/327 716/133

(Continued)

FOREIGN PATENT DOCUMENTS

CN 1666202 A * 9/2005 ......... G06F 17/5045
CN 107533577 A 1/2018

OTHER PUBLICATIONS

Li et al. On Timing Model Extraction and Hierarchical Statistical Timing Analysis IEEE Transactions on Computer-Aided Design of Integrated Circuits and Systems, vol. 32, No. Mar. 3, 2013 (Year: 2013).*

(Continued)

*Primary Examiner* — Rehana Perveen
*Assistant Examiner* — Cuong V Luu
(74) *Attorney, Agent, or Firm* — Fenwick & West LLP

(57) ABSTRACT

A system performs efficient verification of a circuit design. The system receives a circuit design including circuit blocks. The system identifies some of the circuit blocks as modeled circuit blocks. The system generates simplified reduced models (SRMs) for the modeled circuit blocks. A simplified reduced model includes circuit details sufficient for static verification of the circuit design but excludes some of the circuit details for the modeled circuit block. The system performs static verification of the circuit design using the simplified reduced models.

19 Claims, 8 Drawing Sheets

(56) References Cited

U.S. PATENT DOCUMENTS

| | | | | |
|---|---|---|---|---|
| 6,996,515 | B1 * | 2/2006 | Foltin | G06F 30/3312 716/108 |
| 7,031,889 | B1 * | 4/2006 | McBride | G06F 30/33 703/2 |
| 8,239,798 | B1 | 8/2012 | Goyal et al. | |
| 9,881,117 | B1 | 1/2018 | Patra et al. | |
| 11,295,057 | B1 * | 4/2022 | Kim | G06F 30/27 |
| 2003/0110457 | A1 | 6/2003 | Nadeau-Dostie et al. | |
| 2005/0096894 | A1 | 5/2005 | Szpak et al. | |
| 2010/0064271 | A1 * | 3/2010 | Chen | G06F 30/33 716/106 |
| 2017/0011138 | A1 | 1/2017 | Venkatesh et al. | |

OTHER PUBLICATIONS

Cadence Hierarchical Timing Analysis: Pros, Cons, and a New Approach Cadence Design Systems, Jul. 3, 2016 (Year: 2016).*

CN Office Action, including Search Report Mailed on May 14, 2026 for CN Application No. 202210198535, 22 page(s).

* cited by examiner

AUTOMATED DESIGN HIERARCHY IDENTIFICATION AND SIMPLIFIED REDUCED MODEL GENERATION FOR STATIC VERIFICATION OF CIRCUIT DESIGNS

CROSS REFERENCE TO RELATED APPLICATIONS

This application claims the benefit under 35 U.S.C. § 119(e) of U.S. Provisional Patent Application Ser. No. 63/155,859, "Automated Design Hierarchy Identification and Simplified Reduced Model Generation for Static Verification," filed Mar. 3, 2021, which is incorporated herein by reference in its entirety.

TECHNICAL FIELD

The present disclosure relates to verification of circuit designs in general and more specifically to automated identification of a design hierarchy and generation of simplified reduced model for efficient static verification of circuit designs.

BACKGROUND

A static verification system may include various static verification tools for verifying completeness and consistency of low power, clock crossing, structural linting or other intents of the design at different implementation stages. Static verification techniques may produce violations to identify the structural and consistency related issues in the design. A violation report may be generated that includes violation instances that state the type of problem present in the design along with structural/auxiliary information. Increased size and complexities of circuit designs has significantly impacted the overall turnaround time (TAT) for static verification. As a result, static verification runs often do not complete because traditional computing machines are not able to accommodate the huge memory footprint demanded by the verification tools. In addition, the total runtime of full design sign-off runs may take very long time, for example, several days. This in turn significantly impacts the overall verification convergence cycles.

SUMMARY

A system performs efficient verification of a circuit design. The system receives a circuit design including circuit blocks. The system identifies some of the circuit blocks as modeled circuit blocks. The system generates simplified reduced models (SRMs) for the modeled circuit blocks. A simplified reduced model includes circuit details sufficient for static verification of the circuit design but excludes some of the circuit details for the modeled circuit block. The system performs static verification of the circuit design using the simplified reduced models.

In an embodiment, the system performs distributed execution over multiple processors for determining the SRMs. The techniques disclosed allow distribution execution, thereby allowing the process to complete in reasonable time.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
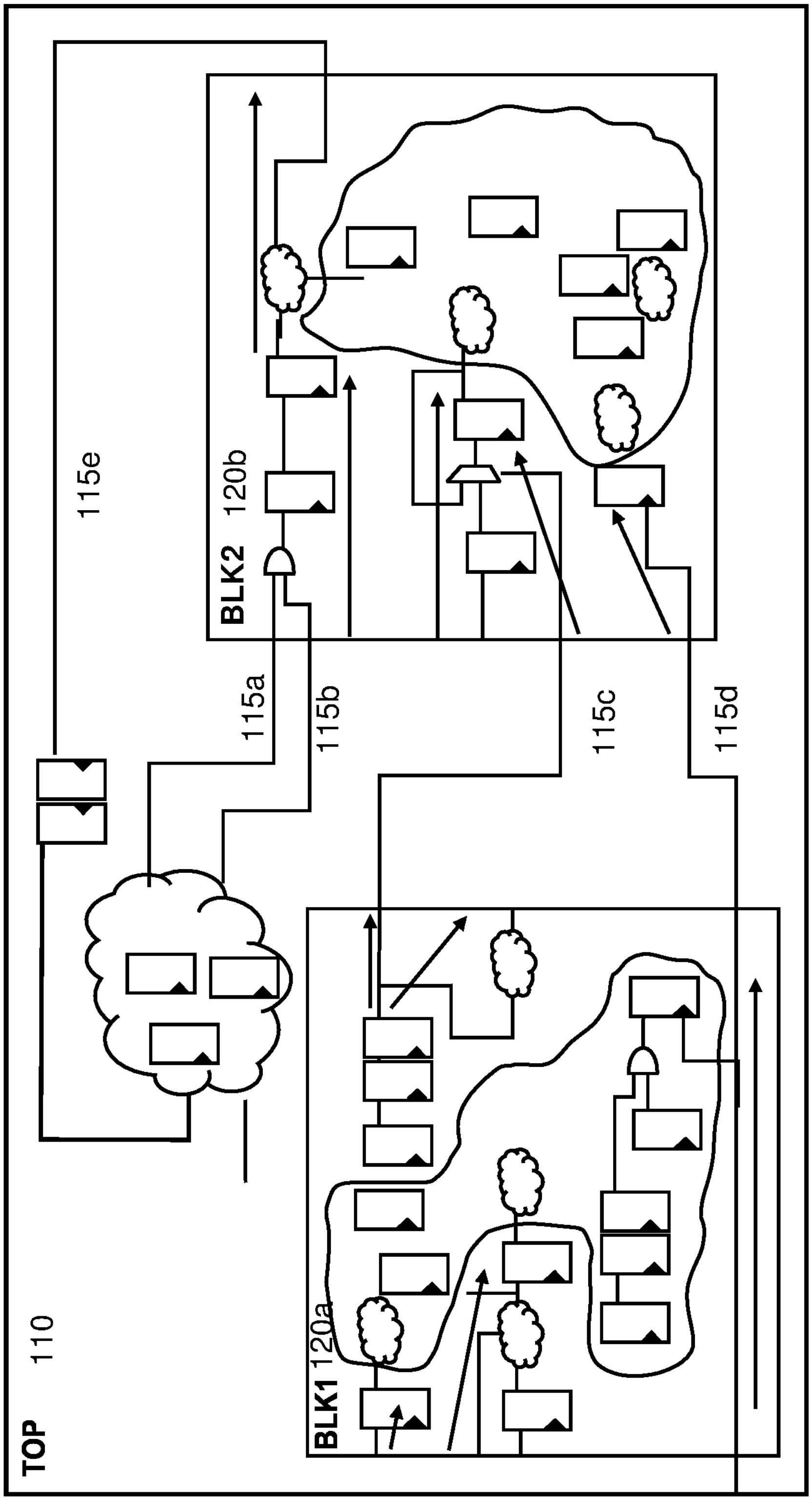
FIG. 1 illustrates SRM (simplified reduced model) based verification of a circuit design according to an embodiment.

Aspects of the present disclosure relate to verification of circuit designs. A system performs static verification of a circuit design represented as a hierarchy of circuit blocks. According to an embodiment, the hierarchy of circuit blocks includes a top-level circuit block and circuit blocks within the top-level circuit block. The system identifies the modeled circuit blocks based on an analysis of the hierarchy. The system identifies some of the modeled circuit blocks to be replaced by a simplified reduced model (SRM) circuit block. An SRM circuit block retains details of the actual circuit design that are useful for static verification and represents the rest of the circuit design within the SRM circuit block by a simplified model used in static verification. The simplified reduced model is simpler and more efficient for performing static verification by a verification system, e.g., a processor. In this disclosure, the terms intellectual property (IP), block and circuit block are used interchangeably.

Each modeled circuit block may be separately verified. Accordingly, the static verifications of the individual modeled circuit blocks and of the top-level circuit block using the simplified reduced models (rather than the full circuit blocks) may be parallelized. This reduces the execution time of the verification of large circuit designs.

In one aspect, the system identifies the modeled circuit blocks using auxiliary information describing the circuit design. Auxiliary data refers to data that is provided by the user during circuit design for electronic design automation operations performed on the circuit design other than circuit verification, for example, unified power format specification for power intent, system design constraints used to specify the design intent, including timing, power and area constraints for a design, and so on. Examples of auxiliary specifications include a unified power format (UPF) specification, a system design constraints (SDC) specification, a common power format (CPF) specification, or an instrumentation design constraints (IDC) specification associated with the circuit design. The system uses the auxiliary information to determine boundaries of circuit blocks as well as constraints for the simplified reduced models of the modeled circuit blocks.

The use of simplified reduced models makes the process of static verification computationally efficient. For example, simplified reduced models typically have smaller memory footprint compared to the full circuit blocks, thereby allowing larger circuits to be loaded in memory and processed efficiently compared to other approaches. The generation of the simplified reduced models and verification of the underlying circuit blocks may be performed in a distributed fashion using multiple processors to improve the execution time. Automatic identification of simplified reduced models makes the overall process less cumbersome, and less error prone compared to manual approaches.

In an embodiment, the system further determines constraints associated with modeled circuit blocks used as SRMs and used the constraints in static verification of the circuit design. In an embodiment, the system receives commands for performing operations related to circuit design, for example, commands for specifying power intent, design constraints, instrumentation constraints, and so on. The system extracts parameters of the command and generates constraints based on the parameters.

In an embodiment, the system receives an auxiliary specification associated with the circuit design and selects the modeled circuit blocks based on the auxiliary specification. In one embodiment, the system receives parameters describing circuit blocks of the circuit design and determines a weighted aggregate of the parameters. The system selects the modeled circuit blocks based on a weighted aggregate of the parameters.

FIG. 1 shows an example of SRM based verification of a circuit design. Examples of static verification systems include a static low power verification system, a clock domain crossing verification system, and a reset domain crossing (RDC) verification system. FIG. 1 and the other figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral (e.g., "115" in the text refers to reference numerals "115a", "115b", and/or "115n" in the figures).

The circuit design 110 received as input for verification is labeled TOP. The TOP circuit design 110 includes many circuit blocks 120*a*, 120*b*, and so on that are interconnected via connections 115, for example connections 115*a*, 115*b*, 115*c*, 115*d*, 115*e*, and so on. The system identifies a set of modeled circuit blocks that represents circuit blocks that are candidates for being determined as SRM circuit blocks. Certain circuit blocks may not be used as modeled circuit blocks for example, circuit blocks that include too few gates (i.e., below a first threshold value) or too many gates (i.e., above a second threshold value). In an embodiment, the SRM identification module 410 determines the modeled circuit blocks and the SRM circuit blocks. An SRM circuit block may also be referred to herein as an SRM. The system automatically identifies BLK1 120*a* and BLK2 120*b* from among the modeled circuit blocks as SRM circuit blocks. The system performs verification of the circuit design TOP 110, by performing verification of the SRM blocks, i.e., BLK1 120*a* and of BLK2 120*b*, rather than the full circuit design. The verification of the circuit design using SRMs is computationally efficient and takes significantly fewer computing resources.

SRMs of BLK1 and BLK2 may be manually constructed. However, typically the boundaries or circuit blocks are not well identified. Furthermore, the block level constraints in terms of auxiliary inputs (for example, UPF/SDC/etc.) are not available. As a result, the circuit designer could manually create all of these prerequisites before enabling the SRM based verification run of the TOP block. However, this is time consuming and error prone. The overall turnaround time may not be reduced because of manual interventions.

The system according to various embodiments, automatically determines the circuit block boundaries as well as the constraints of the determined circuit blocks. The system automatically identifies the SRM boundaries in a design by determining the circuit blocks that should be represented by SRMs based on analysis of the design structures. After identification of the block level boundaries, the system further generates the associated constraints (UPF/SDC/etc.) for these circuit blocks. Once the system automatically extracts boundaries and associated constraints for a block, the system invokes a distributed scheduler to perform distributed execution of the process of generation of SRM circuit blocks using multiple processors. Once SRM circuit blocks are generated in a distributed fashion, the system automatically starts the TOP level verification run using the SRM circuit blocks.

The above-mentioned steps may be performed for a given circuit design without any manual intervention. The system and process disclosed herein improves the turnaround time of the system-on-chip sign-off runs. The disclosed techniques can be extended to any static verification system or tool, for example, low power verification tool, clock domain crossing (CDC) verification tool, and reset domain crossing (RDC) verification tool, and so on.

Figure 2:
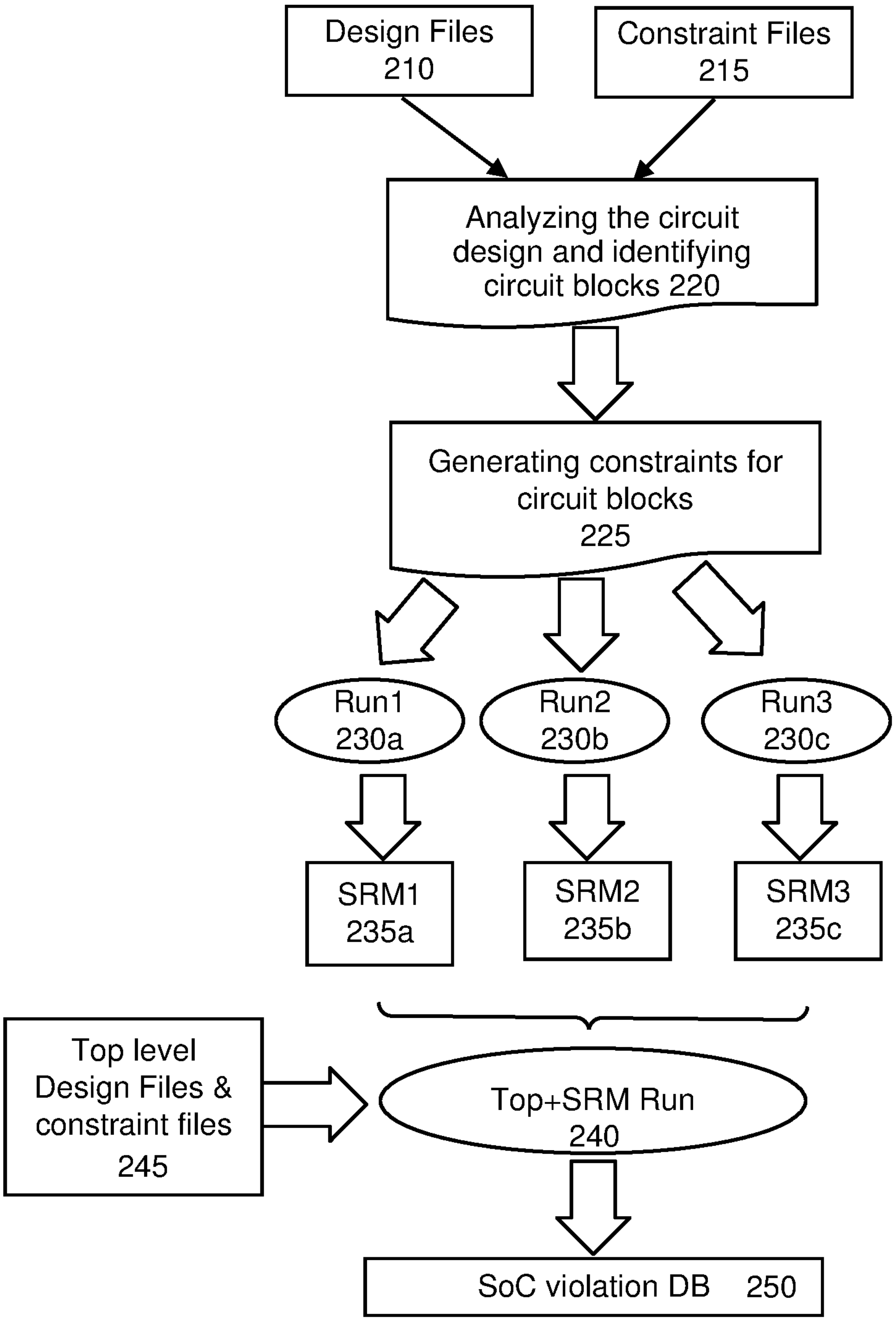
FIG. 2 shows a process of SRM based verification of a circuit design according to an embodiment.

FIG. 2 shows a process of SRM based verification of a circuit design. In FIG. 2, the SRMs are labeled as SRM1, SRM2, SRM3. The system receives as input circuit design files 210 and constraint files 215. The system analyzes 220 the circuit design and identifies circuit blocks. The system may allow a user to manually identify circuit blocks or automatically determine circuit blocks or perform a combination of the two. The system finds modeled circuit blocks to be represented by SRMs. The system generates 225 the constraints associated with these SRM circuit blocks. The system performs distributed SRM generation for these identified modeled circuit blocks by scheduling multiple runs 230*a*, 230*b*, 230*c* of processes generating the SRMs. The generated SRMs 235*a*, 235*b*, 235*c* are provided as input along with the top-level design files and constraint files 245 for a final SRM-based SoC sign-off run 240. The system stores the result of the final SRM-based SoC sign-off run 240 in a database, for example, an SoC violation database 250.

Figure 3:
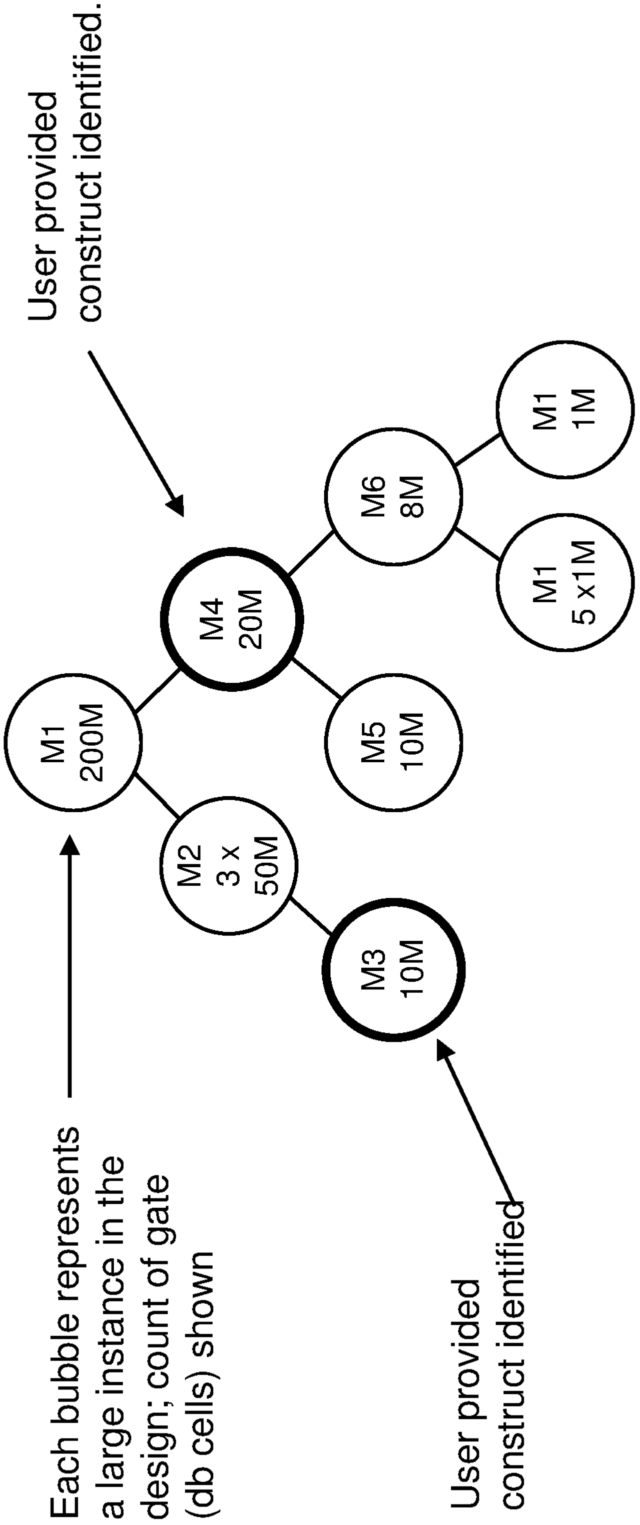
FIG. 3 shows an example circuit design tree according to an embodiment.

FIG. 3 shows an example circuit design tree according to an embodiment. The example circuit design is represented as a hierarchy of circuit blocks. Each circle/bubble in the figure illustrates a circuit block with the count of gates indicated as a numeric value within the circle. For example, the top-level circuit block is M1, which includes two circuit blocks M2, and M3. Circuit block M2 includes another circuit block M3, whereas circuit block M4 includes circuit blocks M5 and M6. The system identifies some of the circuit blocks as modeled circuit blocks, for example, M3, M4, M5, and M6. In one embodiment, the system identifies some circuit blocks as modeled circuit blocks by selecting circuit blocks that have more than a threshold number of components such as a number of gates. The system further selects some of the modeled circuit blocks as SRMs, for example, M3 and M4. In one embodiment, the system selects some modeled circuit blocks as SRMs by analyzing auxiliary data provided by users for performing operations that may not concern verification, for example, for specifying power constraints, area constraints, timing constraints, and so on. The system extracts circuit block specifications provided by users for various purposes and uses them as SRM circuit blocks. The system performs verification of the circuit design using the SRM circuit blocks M3 and M4.

Figure 4:
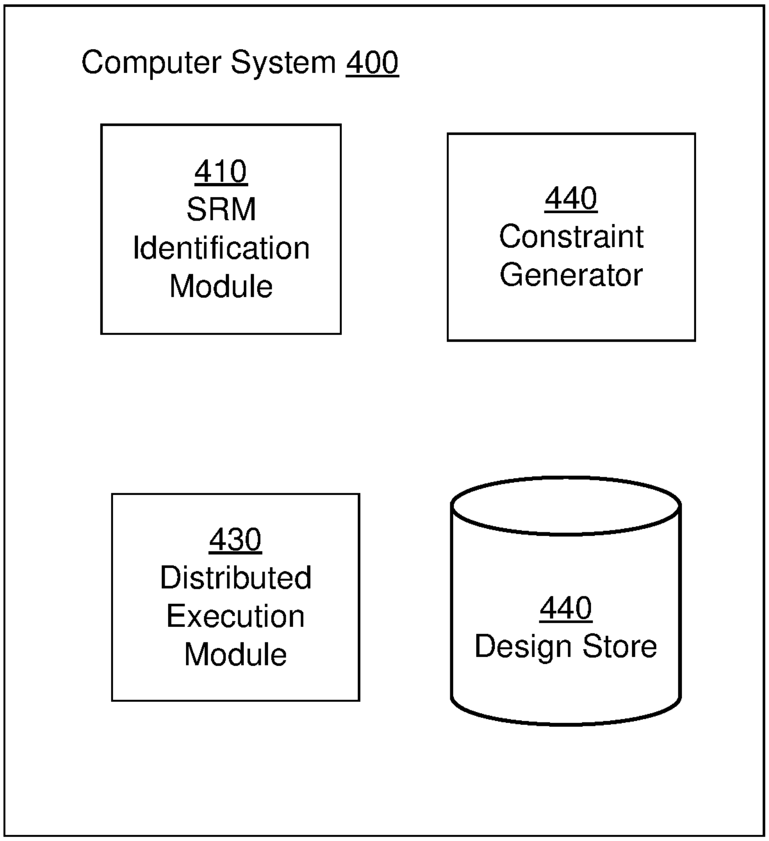
FIG. 4 shows the system architecture of a computer system for performing verification of circuit design according to an embodiment.
Figure 8:
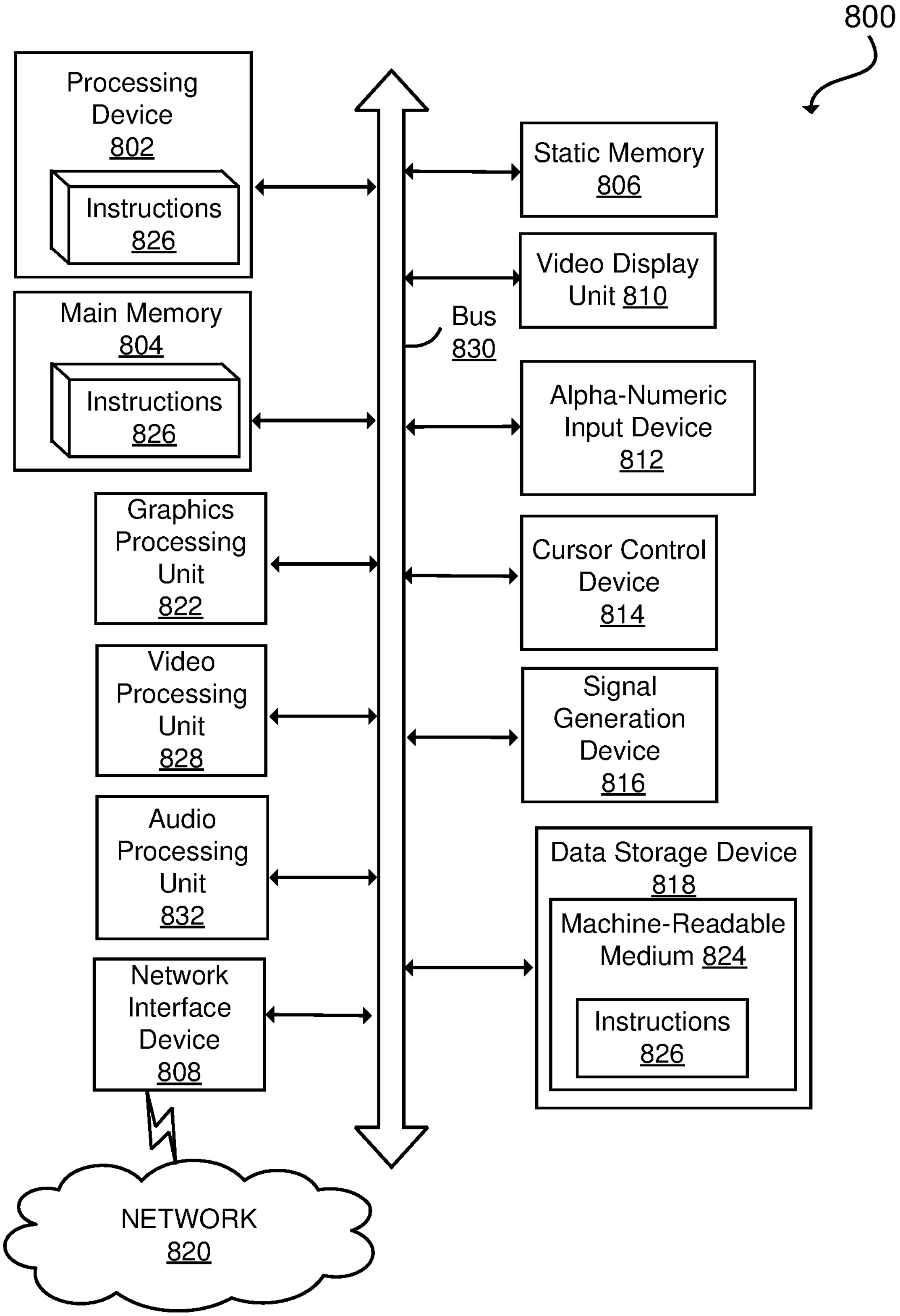
FIG. 8 depicts a diagram of an example computer system in which embodiments of the present disclosure may operate.

FIG. 4 shows the system architecture of a computer system for performing verification of circuit design according to an embodiment. The computing system 400 includes an SRM identification component 410, a constraint generation component 420, a distributed execution component 430, and a circuit design store 440. The computing system comprises a processes and memory, for example, as illustrated in FIG. 8. The memory stores various components that may represent software modules. The components include instructions for performing various steps of the processes disclosed herein. The processor accesses instructions stored in the memory and executes them. Other embodiments may include more or fewer components. The components shown in FIG. 4 may be loaded into the main memory 804 shown in FIG. 8 for execution. The instructions of these components may be executed using one or more processors, for example, the processing device 802 shown in FIG. 8.

The circuit design store 440 stores the circuit design being processed. The circuit design store 440 also includes metadata describing the circuit design, for example, the circuit blocks, metadata indicating whether a circuit block is identified as a modeled circuit block, SRMs, and so on.

The SRM identification component 410 analyzes the circuit design and various inputs received from users that may be provided in connection with circuit verification as well as input provided by users for performing operations other than circuit verification, for example, specifying power intent for power optimization.

The constraint generation component 420 determines constraints applicable to the various SRMs after SRMs are identified.

The distributed execution component 430 schedules the various actions necessary for performing distributed execution of the verification process.

Figure 5:
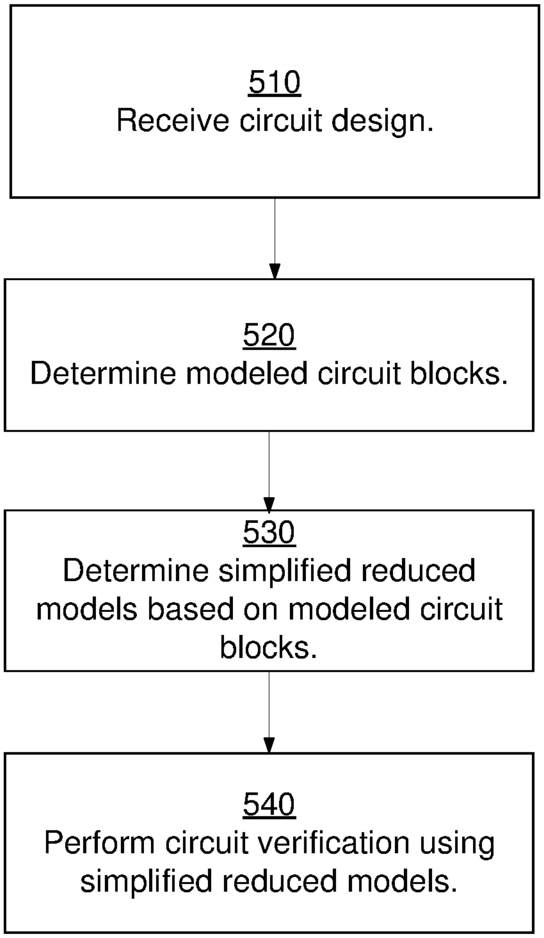
FIG. 5 shows a flowchart illustrating the process for performing verification of circuit design according to an embodiment.

FIG. 5 shows a flowchart illustrating the process for performing verification of circuit design according to an embodiment. The steps may be performed in an order different from that indicated herein. The steps may be performed by various components of the computing system 400, referred to herein as the system.

The system receives 510 a circuit design including multiple circuit blocks. The system determines 520 that some of the circuit blocks are modeled circuit blocks, i.e., candidates for being selected as SRM circuit blocks. The system generates 530 simplified reduced models for the modeled circuit blocks. The simplified reduced models include circuit details sufficient for static verification of the circuit design and exclude at least some of the circuit details for the modeled circuit block. The system performs 540 static verification of the circuit design using the simplified reduced models of the modeled circuit blocks, for example, by performing distributed execution using multiple processors.

The system uses a lightweight design read which creates a design database with less memory footprint. A light weight design read builds a simpler data structure compared to a read performed for a specific EDA task, for example, for timing analysis. As a result, the light weight design consumes less memory for storage and also less processing power for analyzing. Utilizing this design database, the system performs structural analysis to identify the circuit block hierarchies. The identified circuit blocks become candidates for SRM generation.

The system uses various methods to select the modeled circuit blocks for SRM generation. According to one embodiment, the system analyzes auxiliary data provided by user. The system determines whether the auxiliary data includes (1) explicit specification (or explicit guidance) of circuit block boundaries that can be used for defining SRMs, for example, constructs that explicitly identify module definitions for providing constraints (2) implicit specification (or implicit guidance) of circuit block boundaries, for example, constructs that may not directly identify module boundaries for providing constraints but can be used indirectly for inferring module definitions and corresponding constraints.

Explicit guidance represents a structured way in which block boundaries and associated constraints are specified, for example, using a construct that specifies a circuit block and provides all constraints related to the circuit block in one or more files, for example, UPF files or SDC files. The construct loads all the constraints in one run, for example, UPF files loaded by a load command or SDC files loaded in an SOC run. The construct may specify the circuit block instance, for example, by specifying a hierarchical name. As an example, the constraints for circuit block identified by the hierarchical name u1/u2/u3/inst may be loaded by the following commands that act as explicit guidance of circuit block boundaries.

load_upf file1.upf-scope u1/u2/u3/inst load_upf file2.upf-scope u1/u2/u3/inst

Implicit guidance represents an unstructured way in which circuit block boundaries and associated constraints are specified. For example, circuit block constraints may be specified using an SOC constraint file in scattered manner. User can add multiple set_scope command with different hierarchical names to provide the reference of a circuit block. In this embodiment, the system analyzes the various hierarchical names used in the specification to identify the ones that are referring to the same circuit block. Following is an example of specification that uses different hierarchical names “u1/u2/u3/inst”, “u3/inst”, and “u2/u3/inst” to refer to the same circuit block.

```
set_scope u1/u2/u3/inst
. . . . . .
. . . . . . . //some constructs
set_scope . . /. . /
. . .
set_scrope u3/inst
. . . .
. . . .
. . .
set_scope . ./. ./. ./
. . .
set_scope u2/u3/inst
. . . . . .
set_scope.
```

The different set_scope commands may also refer to different circuit blocks. The system according to an embodiment, collects the various hierarchical names specified by the set_scope commands to identify the hierarchical names that refer to the same circuit blocks and collects the constraints specified by the corresponding set_scope constructs.

A construct may also be referred to herein as a command Examples of auxiliary data represent specification received from user in a context other than circuit verification, for example, unified power format specification for power intent, system design constraints used to specify the design intent, including timing, power and area constraints for a design, and so on. The system receives from the user, explicit/implicit inputs regarding the boundaries of circuit block to be modeled as SRMs (SRM blocks or SRM circuit blocks). The system utilizes these inputs automatically and uses them to identify boundaries for SRM circuit blocks.

According to one embodiment, if a user explicitly provides the information regarding circuit block hierarchies in its auxiliary data, the system utilizes this information to identify SRM circuit blocks. As an example, for specifying power constraints using UPF, the auxiliary data includes specification using load_upf construct through which user explicitly provides the circuit block boundaries. The following are example UPFs including Top.upf, M3.upf, and M4.upf that may be loaded using a load_upf command based on explicit user guidance.

```
Top.upf
create_power_domain TOP-include_scope
set_scope M3
load_upf M3.upf
set_scope
set_scope M4
load_upf M4.upf
set_scope . .
. . . . . . . . .
M3.upf
create_power_domain PD1-include_scope
. . . . . . . . .
M4.upf
create_power_domain PD1-include_scope
. . . . . . . . .
```

In this example, the system reads the UPF specification and analyzes various commands to identify circuit block boundaries for modeled circuit blocks. The system may use predefined rules for analyzing the commands. For example, if the system identifies the command create_power_domain, the system determined whether the command specifies an—include_scope argument. If the command specifies the—include_scope argument, the system uses the value specified for the argument, for example, TOP as a modeled circuit block. Accordingly, from the command "create_power_domain TOP—include_scope" the system determines TOP as a modeled circuit block. Similarly, the system extracts the value of the argument—scope from the command load_upf as a circuit block. For example, the system analyzes the command "load_upf M3.upf-scope M3" to determine that M3 is a modeled circuit block and the system analyzes the command "load_upf M4.upf-scope M4" to determine that M4 is a modeled circuit block.

According to another embodiment, the system uses guidance based on implicit user provided auxiliary data. If a user implicitly provides information regarding circuit block hierarchies in its auxiliary data, the system utilizes that information for identification of SRM circuit blocks. The following is an example specification based on UPF. The UPF specification used set_scope as an example construct through which user implicitly provides the circuit block boundaries. The following shows examples of auxiliary input with implicit user guidance including top.upf, m2_aux.upf, and M4_aux.upf.

```
Top.upf
create_power_domain TOP-include_scope
set_scope M3
create_power_domain PD1-include_scope
. . . . . . . . .
set_scope . .
set_scope M4
create_power_domain PD2-include_scope
. . . . . . . . .
set_scope . .
M3_aux.upf
create_power_domain PD1-include_scope
. . . . . . . . .
M4_aux.upf
create_power_domain PD2-include_scope
. . . . . . . . .
```

The system analyzes the example auxiliary inputs and identifies the command "create_power_domain TOP—include_scope" to determine that the current circuit block is set to TOP. The specification uses command "set_scope" to change (or set) the scope of the power intent specification. For example, the system analyzes "set_scope M3" to infer that the content of the UPF module "M3.upf" represents a modeled circuit block. Accordingly, the system analyzes the set_scope command specified for identifying the scope of the power intent for determining an SRM circuit block. The system identifies all the set_scope commands in the UPF specification and determines SRM circuit blocks based on the modules specified as inputs to the set_scope commands or instances of modules that may be specified as inputs to the set_scope command. For example, the system determines an SRM circuit block based on M3.upf based on command "set_scope M3", an SRM circuit block based on M4.upf based on command "set_scope M4", and so on. Accordingly, the system identifies M3 and M4 as SRM circuit blocks based on both explicit and implicit approaches. The explicit and implicit guidance are used to identify SRM circuit blocks from modeled circuit blocks.

According to another embodiment, the system identifies SRM circuit blocks based on a design complexity of the circuit blocks. For example, if user does not implicitly provide any indication regarding circuit boundaries or in addition to the explicit/implicit auxiliary data provided by the user, the system may rely on different design parameters to identify a modeled circuit block as an SRM candidate. The system may perform analysis of one or more of the following example design parameters to determine if a modeled circuit block is a desired candidate as an SRM circuit block: (1) a total gate count inside the circuit block hierarchy, (2) a depth of the circuit block hierarchy (3) a height of the design tree for the circuit block (length of the longest downward path from root to the leaf node), and (4) a total count of application specific gates of a type and/or characteristic inside the hierarchy.

The system automatically extracts these parameters from the circuit design and various types of auxiliary data provided by the user and uses a weighted aggregate of these parameters to determine whether a modeled circuit block should be used as an SRM circuit block.

An example weighted model is given below where the various parameters are assigned weights, (e.g., parameter 1 value (Param1Val), parameter 2 value (Param2Val), parameter K value (ParamKVal) are assigned weights W1, W2, Wk, respectively. The system may assign weights based on a measure of significance of the parameter in deciding the overall weight for a modeled circuit block to qualify as an SRM candidate.

$$\text{Total Weight}=W1*\text{Param1}Val+W2*\text{Param2}Val++Wk*\text{ParamKVal} \quad (1)$$

The total aggregate weight for a modeled circuit block represents an SRM score of the modeled circuit block. Accordingly, if the SRM score exceeds a threshold value for a modeled circuit block, the system determines that the modeled circuit block is an SRM circuit block.

In some embodiments, the system uses a threshold on the gate count of a modeled circuit block to determine whether the modeled circuit block should be used as an SRM circuit blocks. For the example of FIG. 3, the system may determine that a circuit block should be used as SRM circuit block if the number of gates in a modeled circuit block has at least a threshold of 20 million (M) gate count for the circuit block hierarchies. Accordingly, the top few circuit blocks in the hierarchy ranked by their gate counts that have at least the threshold gate counts are selected as SRM circuit blocks. For example, M2 and M4 are identified as SRM circuit blocks.

The system identifies a modeled circuit block as an SRM circuit block if the use of this SRM circuit block provides a desired gain in terms of run time and memory for a top-level run for the entire circuit design or for a portion of the circuit design. If the system uses modeled circuit blocks with very few (below a threshold number of) design gates as SRM circuit blocks, then the final SoC run using all these SRM block will not be optimized in terms of memory and run time. Therefore, the system analyzes various parameters of modeled circuit blocks to determine which modeled circuit blocks should be used as SRM circuit blocks. An example parameter is gate count of the circuit blocks.

For example, in FIG. 3, the circuit block M1 may be identified as a modeled circuit block using user provided constraints of auxiliary data, however the gate count of circuit block M1 is only 1 M which is only 0.5% of total gate counts of the circuit design. Accordingly, the system determines that this modeled circuit block is not a desired candidate for being used as an SRM circuit block. Similarly, other design parameters such as the depth of the circuit block in the hierarchy of circuit blocks, a number of smaller circuit blocks contained by the circuit block, and so on may be used as criteria to identify a desired SRM candidate for the SoC run. These parameters may also be referred to as circuit gate count (number of design gates in the circuit block), circuit height (height of circuit block in the circuit hierarchy), sub circuit count (count of circuit blocks contained within the circuit block).

Once the system identifies SRM circuit blocks, the system generates required constraints (e.g., UPF, Clock (SDC), . . . ) for the identified SRM circuit blocks. In an embodiment, the system uses explicit guidance provided by the user in auxiliary data. The system receives explicit information describing circuit block constraints in auxiliary data and uses it as constraints for SRM circuit blocks if the corresponding circuit block was identified as an SRM circuit block.

As an example of explicit guidance, the system receives from the user, a load_upf command in an auxiliary design file. The load_upf command identifies a circuit block instantiated in the circuit design or a module definition. The auxiliary design file may be specified for a circuit block as an argument of the load_upf command. Following are example UPF specifications for modules top.upf, M3.upf, and M4.upf. The UPF specification of a module includes constructs that are used by the system as constraints for verification.

```
Top.upf
create_power_domain TOP—include_scope
set_scope M3
load_upf M3.upf
set_scope . .
set_scope M4
load_upf M4.upf
set_scope . .
M3.upf
create_power_domain PD1-include_scope
. . . . . . . . .
M4.upf
create_power_domain PD1-include_scope
. . . . . . . . .
```

The system may use the module definition or instances identified by the load_upf command as modeled circuit blocks and further determine whether the modeled circuit block is an SRM circuit block. In some embodiments, the system uses the module definition or instances identified by the load_upf command as SRM circuit blocks. The system may further extract the arguments of the corresponding load_upf command to determine the constraints for the SRM circuit blocks. For example, the system determines that the "load_upf M3.upf" command was specified for M3 modeled circuit block that was identified as an SRM circuit block. The system extracts the argument M3.upf specified for the load_upf command and extracts the constraints for the corresponding M3 SRM circuit block from the M3.upf module. Similarly, the system determines that the "load_upf M4.upf" command was specified for M4 modeled circuit block and determines that M4 should be used as an SRM circuit block based on the use of the circuit block in the load_upf command. In this example the system determines module boundaries for an SRM block and constraints for the SRM circuit block from explicitly provided auxiliary data via a load_upf command. The load_upf command is an example of auxiliary data provided by the user.

In other embodiments, the user may specify other types of auxiliary data, for example, an SDC command that explicitly identifies an instance of a module or a module for purposes of defining timing constraints or area constraints. In other embodiments, the user may specify other types of auxiliary data, for example, an IDC command that explicitly identifies an instance of a module or a module for purposes of defining constraints used for purposes of debugging.

Following is an example of SDC commands that may be used for determining SRM circuit blocks and their constraints.

```
create_clock-name i1/ck1 clk2-period 50
create_clock-name ck1{n:clk1}-period 50
create_generated_clock-name gck1 [get pins {i1.gck1.Q [0]}]-source [get_nets {clk1}]-divide_by 2
set_max_delay—from [get_cells {i12.r1}]- to [get_clocks ck1]25
set_clock_groups-name grp1-asynchronous-group [get_clocks—include_generated_clocks {ck1}]-group {c:ck2}
set_max_delay—from [all_clocks]-through [get_nets w2]- to [get_clocks ck2]200
```

In another embodiment, the system uses implicit guidance provided by the user in auxiliary data. If the user does not explicitly provide the information regarding circuit block hierarchies, the system analyzes auxiliary design data to extract constructs which give information about various circuit block hierarchies used in the design. The system uses that implicit information to identify the circuit block hierarchy as well as to generate required constructs for the identified hierarchies.

For example, the UPF command set_scope may not provide the full constraint information directly. The set_scope command includes an indication of the start of the scope (e.g., "set_scope Mx") and an indication of the end of the scope (e.g., "set_scope . . . ") Accordingly, a pair of commands specifies the boundary of the scope and constraints may be specified between the pair of commands representing the boundary of the scope. The system identifies all commands specified between the pair of set_scope commands specifying the boundary of the scope and uses them as constraints for a corresponding SRM circuit block. The SRM circuit block may be identified by one of the set_scope commands of the pair, for example, the first set_scope command of the pair. Following are example UPF specifications used for determining constraints for SRM circuit blocks.

```
Top.upf
create_power_domain TOP-include_scope
set_scope M3
create_power_domain PD1-include_scope
. . . . . . . . .
. . . . . . . . .
set_scope . .
set scope M4
create_power_domain PD2-include_scope
. . . . . . . . .
. . . . . . . . .
set_scope . .
M3_aux.upf
create_power_domain PD1-include_scope
. . . . . . . . .
M4_aux.upf
create_power_domain PD2-include_scope
. . . . . . . . .
```

The example UPF specification includes multiple set_scope commands. The system identifies commands between a pair of set_scope commands and exports the identified commands in an auxiliary data file, for example, M3_aux.upf or M4_aux.upf. The system uses the information in the auxiliary data file to extract constraints for the corresponding SRM circuit blocks.

When a user does not provide any information in the auxiliary information then the system may identify various circuit block hierarchies based on other constructs which may not be specified for circuit block definition. For example, the system may receive a create_power_domain command specified by the user to identify circuit blocks and generate constructs for those hierarchies. The system uses the arguments of the create_power_domain command to determine SRM circuit blocks and their constraints. Accordingly, the system may identify a set of commands S1 such that each command in S1 independently identifies a module M1; the system collects these as constraints for an SRM circuit block corresponding to module Mx. Similarly, the system may identify a set of commands S2 such that each command in S2 independently identifies a module My and collects these as constraints for an SRM circuit block corresponding to module My. This may be repeated for other SRM circuit blocks. The commands of the sets S1, S2, and so on may be interleaved and mixed with various other commands in a specification provided as an auxiliary data and the system analyzes the auxiliary data to extract these constraints and group them for different SRM circuit blocks.

Following is an example UPF specification illustrating the determination of constraints for SRM circuit blocks when the user does not provide any information in the auxiliary information.

```
Top.upf
create_power_domain TOP-include_scope
create_power_domain PD1-elements M1
create_power_domain PD2-elements M2
. . . . . . . . .
M3_aux.upf
create_power_domain PD1-include_scope
. . . . . . . . .
M4_aux.upf
create_power_domain PD2-include_scope
. . . . . . . . .
```

In this example load_upf or set_scope is not used in top level upf. In this example, the system interprets various other commands (e.g., create_power_domain) to generate the required SRM circuit blocks and constraints.

Once the SRM candidates are identified and the required constructs are generated, the system generates the SRM circuit blocks for each circuit block hierarchy on a distributed machine framework. To generate SRM circuit blocks for each hierarchy, the system generates a setup file for each modeled circuit block.

To decrease the overall turnaround time, the distributed execution by the system forks out separate jobs for each identified SRM circuit block on a different computing system. Machine pool may be provided by user through setup command.

In some scenarios, the number of circuit block hierarchies is more than the number of machines available in the machine pool. To handle such a scenario, two separate mechanisms may be implemented by the system. The system may perform pipelining of jobs. More than one jobs may be pipelined into one machine. Separate pipeline queue may be created for each machine and more than one job pushed into these queues. Once one job from the queue is completed, then next job from the queue is assigned to the machine. Alternatively, the system may execute more than one job on the same machine concurrently. Machines may have multiple cores available. The system utilizes this fact and pushes more than one job on the same machine.

Other distributed framework concepts like fault tolerance, resource sharing, concurrency etc. are also handled during the distributed execution by the system. After completion of all the SRM circuit block generation runs, the system performs full chip run using the generated SRM circuit blocks. The final result of the full chip run is sent to the user at the end of the full run.

Figure 6:
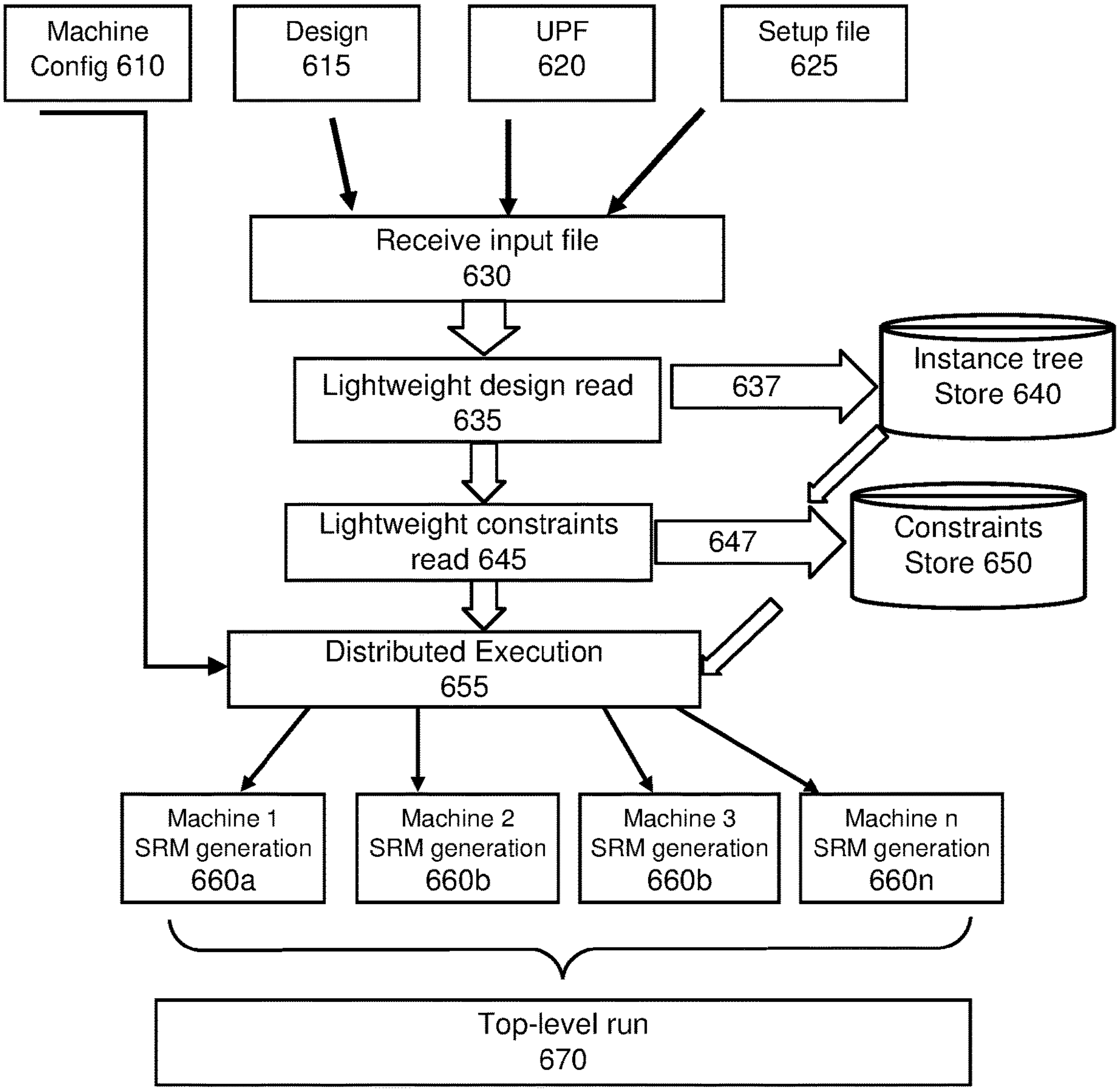
FIG. 6 shows a flowchart illustrating the process for performing verification of circuit design according to another embodiment.

FIG. 6 shows a flowchart illustrating the process for performing verification of circuit design according to another embodiment. Following are example and intermediate outputs of this flow for a low power app.

The system receives 630 via a verification application, inputs associated with the circuit design, for example, the circuit design 615 and power intent 620 specified using the UPF format, and a setup file 625. The system receives the following additional input from the user including the machine configuration 610 and a command to invoke distributed execution.

The system performs a light weight read 635 of the design and extracts circuit block hierarchy from the circuit design. For example, following is a sample design snippet.

```
module top (in1,in2,in3,in4,out1,out2,out3);
input in1,in2,in3,in4;
output out1,out2,out3;
layer1 inst1(in1,in2,in3,in4,out1,out2,out3);
LOW h1(in1,in2,w1,w2,w3_3);
BASIC LS 1s2_LTH (.A(w3_3),Y(w3));
HIGH h2(w1,w2,w3,out1,out2,out3,in4);
endmodule
```

The system populates 637 design tree information and a mapping from instance names to modules based on the light weight design read. This information is stored in an instance tree store 640. For example, based on the above design snippet, the system determines that the command "layer1 inst1 (in1, in2, . . . )" indicates that the instance inst1 is mapped to module layer1 and the command "low h1 (i1, in2, . . . )" indicates that the instance h1 is mapped to module low and command "high h2 (w1, w2, . . . )" indicates that the instance h2 is mapped to module high.

The system performs a lightweight read 645 of any auxiliary data, for example, the UPF input. The system generates 647 the UPF configuration based on the UPF 620 input. The constraints extracted from the auxiliary data such as UPF specification is stored in the constraints store 650. Following is an example UPF specification. For the following snippet of UPF, the system identifies that load_upf command has been used for two hierarchies inst1 and h2. It means we can create UPF configuration for these hierarchies. Since these UPF are used for instances inst1 and h2 respectively, a master module of inst1 and h2 can be identified as a partition for SRM creation. The following shows a sample user UPF.

```
create_power_domain TOP-include_scope
create_supply_port VDD
create_supply_port VDDSW
create_supply_port VS S
create_supply_port VDDN
create_supply_port VDDP
create_supply_net VDD
create_supply_netVDDSW—domain TOP
create_supply_net VSS
create_supply_net VDDN—domain TOP
create_supply_net VDDP—domain TOP
. . . . . . . . . . . . . . . . .
set_scope inst1
load_upf constr.upf
set_scope
set_scope h2
load_upf h2.upf
set_scope . .
```

The system detects the set_scope commands in the specification to determine that the possible candidates for SRM circuit blocks in this example are modules layer1 and HIGH. The system generates SRM creation setup for modules layer1 and HIGH. Following are example setup files generated by the system. When the system identifies the candidates for SRM generation run, the system starts separate SRM model generation runs for each of the SRM candidate run. To execute these runs, the system uses some input configuration file (which contains setup parameters). Since SRM block generation are not directly initiated by user, the system internally starts the run. Therefore, the system generates the setup file for each run. These scripts represent the setup file for each of the runs.

```
layer1_srmgen.tcl
set_app_var lp_onthefly_block_design_read true
configure_tcl_command-disable-cmd read_file
source-echo-verbose calling_non_existing_srm_element_from_top_scope.tcl
set_app_var lp_onthefly_block_design_read false
set_app_var lp_abstraction_onthefly_srm_run false
configure_tic_command-enable-cmd read_file
set_app_var enable_abstraction true
set_app_var enable_lp_abstraction_marking true
configure_lp_abstract_model
read_file-format verilog-netlist-top layer1 "HIGH.v test.v top.v"
read_upf const.upf
create_lp_abstract_model
save_session-session layer1_srmgen
write_abtract_model-file SRM_layer1.v-app lp-format text
report_lp-verbose-limit 0-file SRM_layer1_report.txt
HIGH_srmgen.tcl
set_app_var lp_onthefly_block_design_read true
configure_tcl_comand-disable-cmd read file
source-echo-verbose calling_non_existing_srm_element_from_top_scope.tcl
set_app_var lp_onthefly_block_design_read false
set_app_var lp_abstraction_onthefly_srm_run false
configure_tcl_comand-enable-cmd read-file
set_app_var enable_abstraction true—
set_app_va enable_lp_abstraction_marking true
configure_lp_abstract_model
read_file-format verilog-netlist-top HIGH"IGH. v test.v top. V"
read upf h2.upf
create_lp_abstract_model
save_session-session HIGH_srmgen
write_abstract_model-file-SRM_HIGH.v-app lp-format text
report_lp-verbose-limit 0-file SRM_HIGH_report.txt
```

The system also generates setup for full SoC (top-level) run using these two SRM circuit blocks. Following is a sample set of instructions generated by the system. Once all the SRM models are created, the system performs a full top-level run after stitching all the circuit blocks into SoC. In some embodiments, the system may perform a run for a portion of the SoC. Following script is the setup file for this full top-level run:

```
srmreadback.tcl
set_app_var lp_onthefly_block_design_read true
set_app_var consider_first module_def true
configure_tcl_command disable-cma read file
source-echo-verbose calling_non_existing_srm_element_from_top_scope.tcl
set_app_var lp_onthefly_block_design_read false
set_app_var lp_abstraction_onthefly_srm_run false
configure_tcl_command-enable-cmd read file
set_verilog_abstract_model-module {HIGH layer1}
read_file-format verilog-netlist-top "SRM_layer1.v SRM_HIGH.v HIGH.v test.v top.v"
read_upf top.upf
check_lp-stage all
report_lp-verbose-limit 0-file SRM_Readback_report. txt
save_session-session srmReadback
```

The system subsequently performs the distributed execution 655. The distributed framework is provided with input of these three system generated files and user provided machine configuration as input to start the SRM creation jobs on the provided pool of computing machines, for example, 660*a*, 660*b*, 660*c*, 660*d*, and so on. The system further performs the top-level execution 670 of the verification. The system may generate a report of the progress of the job for users to view. The system may further generate a report with status of each run along with details of path of saved session and violation report.

Figure 7:
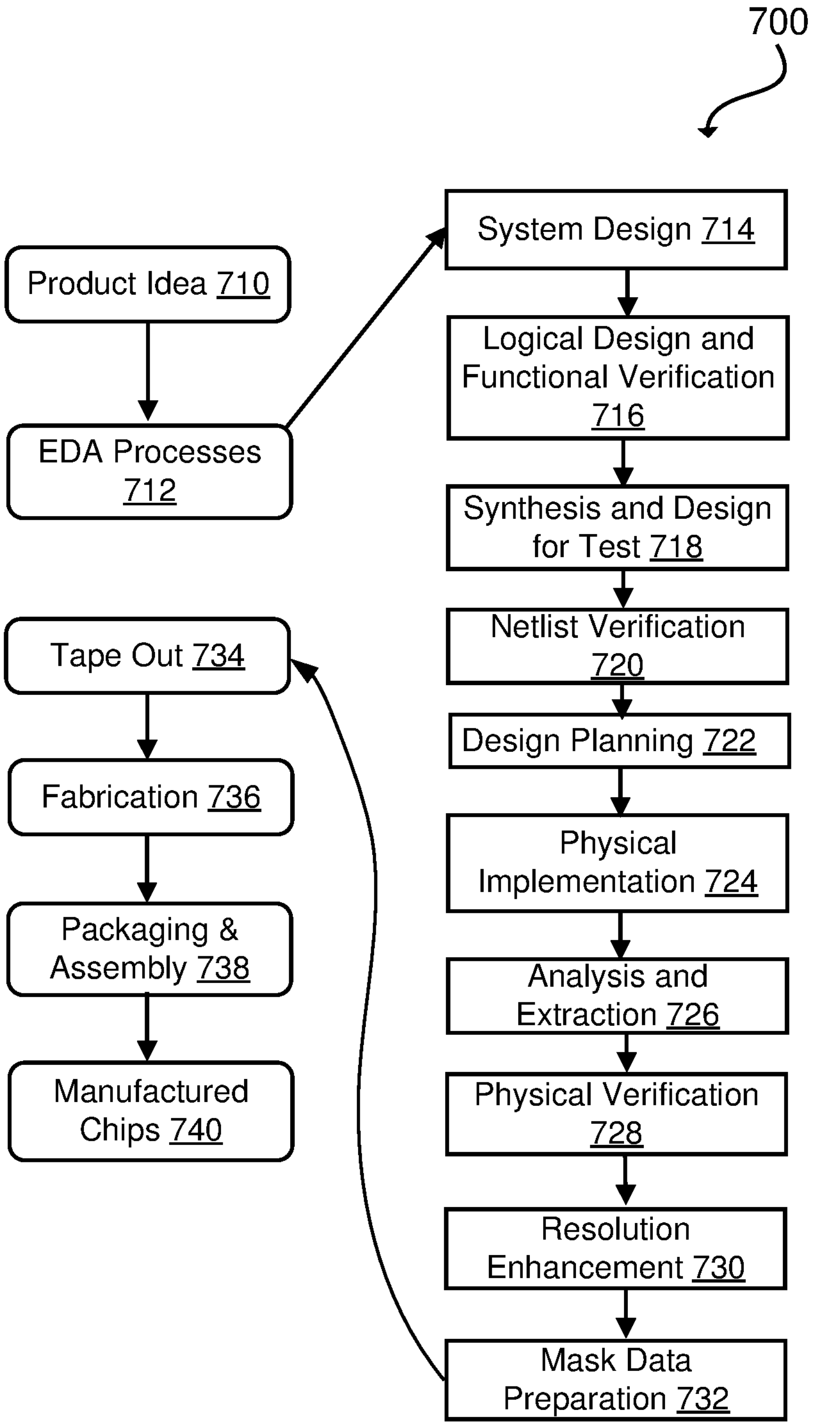
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

receiving a circuit design comprising a plurality of circuit blocks;

determining, by a processor, one or more of the circuit blocks as modeled circuit blocks contained in a top-level circuit;

selecting a subset of one or more of the modeled circuit blocks as simplified reduced modeled (SRM) circuit blocks, comprising:

receiving parameters describing the circuit blocks in the circuit design;

determining a weighted aggregate of the parameters; and selecting the one or more modeled circuit blocks based on the weighted aggregate of the parameters;

generating simplified reduced models for the SRM circuit blocks, wherein a simplified reduced model of an SRM circuit block includes circuit details of a first subset of circuit components of the SRM circuit block for performing static verification of the circuit design and excludes circuit details of a second subset of circuit components of the SRM circuit block; and performing the static verification of the circuit design by (a) performing static verification of the SRM circuit blocks and (b) performing static verification of the top-level circuit using the simplified reduced models of the SRM circuit blocks, wherein performing the static verification comprises performing a functional simulation of the circuit design.

2. The method of claim 1, wherein selecting the one or more modeled circuit blocks based on the auxiliary specification comprises:

receiving explicit guidance from the auxiliary specification based on constructs that explicitly specify circuit blocks as input and specify constraints for the specified circuit blocks.

3. The method of claim 1, wherein selecting the one or more modeled circuit blocks based on the auxiliary specification comprises:

receiving implicit guidance from the auxiliary specification that specifies a plurality of constructs, each construct specifying a path of a circuit block, wherein receiving implicit guidance comprises matching paths of different constructs from the plurality of constructs that correspond to a particular modeled circuit block.

4. The method of claim 1, wherein selecting the one or more modeled circuit blocks comprises:

receiving parameters describing the circuit blocks in the circuit design;

determining a weighted aggregate of the parameters; and selecting the one or more modeled circuit blocks based on the weighted aggregate of the parameters.

5. The method of claim 4, wherein the parameters of a particular circuit block include one or more of:

a total gate count of the particular circuit block;

a depth of the circuit block in a hierarchy of circuit blocks; and a total count of gates of a specific type in the circuit block.

6. The method of claim 1, further comprising:

determining constraints associated with the SRM circuit blocks, wherein performing static verification of the SRM circuit blocks uses the constraints.

7. The method of claim 6, wherein the determining constraints associated with the SRM circuit blocks comprises:

receiving one or more commands for performing operations related to circuit design, the operations associated with one or more of power constraints, design constraints, and area constraints;

extracting a parameter of the command; and generating a constraint based on the parameter.

8. The method of claim 1, wherein the determining one or more of the circuit blocks as modeled circuit blocks is performed based on a top down traversal of circuit blocks of the circuit design.

9. The method of claim 1, wherein generating simplified reduced models for the SRM circuit blocks is performed in parallel on a plurality of processors.

10. The method of claim 1, wherein selecting the one or more modeled circuit blocks based on the auxiliary specification further comprises:

receiving an auxiliary specification associated with the circuit design, wherein the auxiliary specification is one from among unified power format (UPF) specification, a system design constraints (SDC) specification, and a common power format (CPF) specification; and selecting the subset of one or more modeled circuit blocks based on the auxiliary specification.

11. A non-transitory computer readable medium comprising stored instructions, which when executed by one or more computer processors, cause the one or more computer processors to:

receive a circuit design comprising a plurality of circuit blocks;

determine one or more of the circuit blocks as modeled circuit blocks contained in a top-level circuit;

select a subset of one or more of the modeled circuit blocks as simplified reduced modeled (SRM) circuit blocks, comprising:

receiving parameters describing the circuit blocks in the circuit design;

determining a weighted aggregate of the parameters; and selecting the one or more modeled circuit blocks based on the weighted aggregate of the parameters;

generate simplified reduced models for the SRM circuit blocks, wherein a simplified reduced model of an SRM circuit block includes circuit details of a first subset of circuit components of the SRM circuit block for performing static verification of the circuit design and excludes circuit details of a second subset of circuit components of the SRM circuit block; and perform the static verification of the circuit design by (a) performing static verification of the SRM circuit blocks and (b) performing static verification of the top-level circuit using the simplified reduced models of the SRM circuit blocks, wherein performing the static verification comprises performing a functional simulation of the circuit design.

12. The non-transitory computer readable medium of claim 11, wherein instructions to select the one or more modeled circuit blocks cause the one or more computer processors to:

receive an auxiliary specification associated with the circuit design; and select the one or more modeled circuit blocks based on the auxiliary specification.

13. The non-transitory computer readable medium of claim 11, wherein the parameters of a particular circuit block include one or more of:

a total gate count of the particular circuit block;

a depth of the circuit block in a hierarchy of circuit blocks; or a total count of gates of a specific type in the circuit block.

14. The non-transitory computer readable medium of claim 11, wherein the instructions further cause the one or more computer processors to:

determine constraints associated with the one or more SRM circuit blocks, wherein performing static verification of the SRM circuit blocks uses the constraints.

15. The non-transitory computer readable medium of claim 14, wherein the instructions to determine constraints associated with the SRM circuit blocks cause the one or more computer processors to:

receive one or more commands from user for performing operations related to circuit design;

extract a parameter of the command; and generate a constraint based on the parameter.

16. The non-transitory computer readable medium of claim 11, wherein determining one or more of the circuit blocks as modeled circuit blocks is performed based on a top-down traversal of circuit blocks of the circuit design.

17. The non-transitory computer readable medium of claim 11, wherein instructions to generate simplified reduced models for the SRM circuit blocks are executed in parallel on a plurality of computer processors.

18. A system comprising:

a memory storing instructions; and one or more computer processors, coupled with the memory and to execute the instructions, the instructions when executed by the one or more computer processors, cause the one or more computer processors to:

receive a circuit design comprising a plurality of circuit blocks;

determine one or more of the circuit blocks as modeled circuit blocks contained in a top-level circuit;

select a subset of one or more of the modeled circuit blocks as simplified reduced modeled (SRM) circuit blocks, comprising:

receiving parameters describing the circuit blocks in the circuit design;

determining a weighted aggregate of the parameters; and selecting the one or more modeled circuit blocks based on the weighted aggregate of the parameters;

generate simplified reduced models for the SRM circuit blocks, wherein a simplified reduced model of an SRM circuit block includes circuit details of a first subset of circuit components of the SRM circuit block for performing static verification of the circuit design and excludes circuit details of a second subset of circuit components of the SRM circuit block; and perform the static verification of the circuit design by (a) performing static verification of the SRM circuit blocks and (b) performing static verification of the top-level circuit using the simplified reduced models of the SRM circuit blocks, wherein performing the static verification comprises performing a functional simulation of the circuit design.

19. The system of claim 18, wherein instructions to select the one or more modeled circuit blocks cause the one or more computer processors to:

receive an auxiliary specification associated with the circuit design; and select the one or more modeled circuit blocks based on the auxiliary specification.

* * * * *